United States Patent
Linde et al.

(10) Patent No.: US 11,784,363 B2
(45) Date of Patent: Oct. 10, 2023

(54) STRUCTURAL COMPONENT OF A PRIMARY STRUCTURE FOR A VEHICLE WITH AN ELECTRIC ENERGY STORE AND ELECTROTHERMAL TEMPERATURE REGULATION SUBLAYER

(71) Applicant: Airbus Operations GmbH, Hamburg (DE)

(72) Inventors: Peter Linde, Hamburg (DE); Matthias Hegenbart, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 17/584,762

(22) Filed: Jan. 26, 2022

(65) Prior Publication Data

US 2022/0311072 A1    Sep. 29, 2022

(30) Foreign Application Priority Data

Jan. 28, 2021   (DE) .......................... 102021101976.1

(51) Int. Cl.
*H01M 10/44* (2006.01)
*H01M 10/63* (2014.01)
(Continued)

(52) U.S. Cl.
CPC ............. *H01M 10/63* (2015.04); *B60L 50/64* (2019.02); *H01M 10/613* (2015.04);
(Continued)

(58) Field of Classification Search
CPC .... H01M 10/63; H01M 10/637; H01M 10/65; H01M 10/655; H01M 10/613;
(Continued)

(56) References Cited

U.S. PATENT DOCUMENTS 9,590,228 B1    3/2017  Wang et al.
10,559,792 B1   2/2020  Combs
(Continued)

FOREIGN PATENT DOCUMENTS

DE    102017118310 A1    2/2019
DE    102017128016 A1    5/2019
(Continued)

OTHER PUBLICATIONS

Computer-generated translation of WO 2020221806, Walter et al., "Temperature Control System for Lithium Ion Battery Cells", Nov. 5, 2020.*

(Continued)

*Primary Examiner* — Raymond Alejandro
(74) *Attorney, Agent, or Firm* — Greer, Burns & Crain, Ltd.

(57) ABSTRACT

A structural component of a primary structure for a vehicle, the structural component including a fiber composite laminate with a plurality of fiber composite sublayers. The plurality of fiber composite sublayers includes an electric energy store which is configured as a multilayer electrochemical fiber composite battery to store electric energy in a rechargeable manner; and an electrothermal temperature regulation sublayer which is configured to supply thermal energy to the electric energy store and conducting thermal energy away from the electric energy store as required to regulate a temperature. A control device, which is connected to the electric energy store and the electrothermal temperature regulation sublayer, is configured to control a temperature regulation of the electric energy store by means of the electrothermal temperature regulation sublayer.

20 Claims, 1 Drawing Sheet

(51) Int. Cl.
- *H01M 10/613* (2014.01)
- *H01M 10/615* (2014.01)
- *H01M 10/625* (2014.01)
- *H01M 10/6571* (2014.01)
- *H01M 10/6572* (2014.01)
- *B60L 50/64* (2019.01)

(52) U.S. Cl.
CPC ....... *H01M 10/615* (2015.04); *H01M 10/625* (2015.04); *H01M 10/6571* (2015.04); *H01M 10/6572* (2015.04); *B60L 2200/10* (2013.01); *H01M 2220/20* (2013.01)

(58) Field of Classification Search
CPC .............. H01M 10/615; H01M 10/617; H01M 10/625; H01M 10/6571; H01M 10/6572; B60L 50/64; B60L 2200/10; B60L 2220/20

See application file for complete search history.

(56) References Cited

U.S. PATENT DOCUMENTS

| | | | |
|---|---|---|---|
| 11,038,200 B2 | 6/2021 | Linde et al. | |
| 2015/0295287 A1* | 10/2015 | Schnaars | H01M 10/625 165/80.4 |
| 2017/0271711 A1 | 9/2017 | Benthien et al. | |
| 2020/0194852 A1* | 6/2020 | Muniz | H01M 50/211 |

FOREIGN PATENT DOCUMENTS

| | | | |
|---|---|---|---|
| DE | 102018110164 A1 | 10/2019 | |
| WO | WO 2020221806 | * 11/2020 | H01M 10/617 |

OTHER PUBLICATIONS

German Search Report; priority document.
L. Asp et al., "Realisation of Structural Battery Composite Materials" 20th International Conference on Composite Materials, Copenhagen, Jul. 19-24, 2015.

* cited by examiner

STRUCTURAL COMPONENT OF A PRIMARY STRUCTURE FOR A VEHICLE WITH AN ELECTRIC ENERGY STORE AND ELECTROTHERMAL TEMPERATURE REGULATION SUBLAYER

CROSS-REFERENCES TO RELATED APPLICATIONS

This application claims the benefit of the German patent application No. 102021101976.1 filed on Jan. 28, 2021, the entire disclosures of which are incorporated herein by way of reference.

FIELD OF THE INVENTION

The present invention relates to a structural component for a vehicle, in particular an aircraft or spacecraft. The invention further relates to an aircraft or spacecraft having such a structural component.

BACKGROUND OF THE INVENTION

Although applicable to a variety of uses, the present invention and the problems underlying it will be described in more detail in relation to passenger aircraft. However, the processes and devices described can likewise be used in various vehicles and in all fields of the transport industry, in particular for road vehicles, for rail vehicles, for aircraft or for watercraft.

In recent times, incorporation of electric energy stores into the fiber composite structure of an aircraft, for example by building up electrochemical cells of functional multilayer laminates which are then integrated by substance-to-substance bonding into the layered fiber composite structure of the aircraft components, has, inter alia, been proposed to an increased extent in the air transport sector for the purpose of weight reduction. Carbon fibers are suitable as electrodes for structural composite batteries, e.g., lithium ion cells, because of their mechanical properties and the ease with which they can take up lithium ions. Carbon fibers have a high stiffness and strength and offer mechanical reinforcement and favorable electrical conductivity for the transport of electrons into and out of the cell. As separator for the transport of ions between the electrodes, it is possible to use a polymer in order to bind the fibers and form a composite battery. Thus, for example, the document EP 2 852 990 B1 describes the production and use of such battery cells in various structural components.

In such a structural integration of batteries, the question as to how an active temperature regulation of the batteries, which can be necessary for most efficient operation of the batteries, can be implemented also arises. This is particularly relevant in the air and space travel sector owing to the greatly fluctuating operating and ambient temperatures.

The documents Leijonmarck et al., "Solid polymer electrolyte-coated carbon fibers for structural and novel micro batteries," Composites Science and Technology, 89, 149-157, 2013 and Asp et al., "REALISATION OF STRUCTURAL BATTERY COMPOSITE MATERIALS," 20th International Conference on Composite Materials, Copenhagen, Jul. 19-24, 2015, describe the use of coated carbon fibers in structural batteries. The carbon fibers have a solid polymer electrolyte coating which has a thickness of several hundred nanometers and is applied by means of an electrochemical bath (a typical diameter of carbon fibers is from about 6 to 7 microns). This coating has, inter alia, an electrically insulating effect, with the fiber diameter being increased by only about one micron as a result of the coating. Such a coating can withstand temperatures of several hundred degrees Celsius.

SUMMARY OF THE INVENTION

In the light of this background, it is an object of the present invention to discover particularly simple and lightweight solutions for regulating the temperature of structural batteries in a vehicle structure.

The invention accordingly provides a structural component for a vehicle, in particular, an aircraft or spacecraft. The structural component comprises a fiber composite laminate. The fiber composite laminate comprises an electric energy store which is configured as multilayer electrochemical fiber composite battery for storing electric energy in a rechargeable manner and an electrothermal temperature regulation sublayer which is configured for supplying thermal energy to the electric energy store and conducting thermal energy away from the electric energy store as required in order to regulate the temperature. The structural component further comprises a control device which is configured for controlling the temperature regulation of the electric energy store by means of the electrothermal temperature regulation sublayer.

Furthermore, an aircraft or spacecraft having a structural component according to the invention is provided.

An idea underlying the present invention is to integrate active heating and cooling layers into the same laminate in which the structural battery layers are also incorporated. Such a multifunctional laminate offers the possibility of regulating the temperature of the structural battery directly within the laminate. Due to such a method of regulation, it is possible, for example, to improve capacity under cold conditions and/or prevent superheating (thermal runaway). Since both the battery and also the heating and cooling elements are integrated directly into the laminate, cables, conduits, plug connections, clamps, holders and the like can be avoided, so that the overall infrastructure is simplified. In this way, weight and installation effort can be saved to a considerable extent. In addition, electrical resistance losses virtually no longer occur. In general, (structural) efficiency and effectiveness of the overall system can be increased, since all elements are present close to one another in an integrated and compact structure.

In principle, the invention makes it possible to configure a primary structure of a vehicle, e.g., a fuselage and/or a wing of an aircraft, as structural energy store, e.g., to supply electric loads onboard the vehicle and/or to realize an electric drive. For this purpose, it is possible to provide an appropriate multilayer laminate which is composed of reinforcing fibers (e.g., carbon fibers, glass fibers, etc.), a suitable matrix material (synthetic resin, electrolyte polymer, etc.) and functional elements (cooling elements, heating elements, contacts, electrodes, conductor tracks, etc.) and is cured to form a rigid structure by application of pressure and heat, with electrically conductive sublayers of the laminate structure being able to function as electric connections. Thus, both the energy store and also the temperature regulation sublayer can be incorporated into the structural component during structural manufacture of the structural component and be cured together with the latter to form a one-piece structure. The control device can manage the electric infrastructure of the structural component, including the charging and discharging of the energy store, the temperature regulation and also the energy transfer from and to other components of the vehicle.

Advantageous embodiments and further developments may be derived from the further dependent claims and also from the description with reference to the figures.

In one further development, the electrothermal temperature regulation sublayer can comprise a cooling sublayer and a heating sublayer. The cooling sublayer can be configured for conducting thermal energy away from the electric energy store when required in order to cool the latter. The heating sublayer can be configured for supplying thermal energy when required to the electric energy store in order to heat the latter.

Cooling and heating functions are thus realized in different sublayers which can be optimized appropriately for their task. However, as an alternative, the two aspects can also be performed by a single sublayer. For example, the temperature regulation sublayer can be configured as a Peltier element which can be used for both cooling and heating (when the direction of current flow is reversed).

According to a further development, the cooling sublayer can comprise a Peltier element.

A Peltier element is an electrothermal transducer which, on the basis of the Peltier effect, generates a temperature difference when current flows through and can in this way be used, in particular, for cooling (in this case also referred to as Peltier cooler or TEC, "thermoelectric cooler"). Specifically, semiconductor transitions between two semiconductor materials having different energy levels (either p-conducting or n-conducting) of the conduction bands are connected in series between two electrically insulating but thermally conductive contact plates or contact films in a Peltier element, by a plurality of blocks of p- and n-doped semiconductor materials (e.g., bismuth telluride, silicon-germanium) being contacted with one another alternately on an upper side and an underside by a metal bridge. The metal bridges at the same time form thermal contact areas and are insulated by the film or plate located on top. Electric current supplied flows through all blocks in succession due to the connection in series. Depending on the current strength and direction, one side cools while the other heats up. The electric current thus pumps heat from one side to the other and produces a temperature difference between the plates/films.

Owing to its fundamental structure, a Peltier element can be integrated into the layer structure of a multilayer composite laminate without great difficulty. Contacting can be effected, for example, at the edge of the exterior plates by an electric connection, e.g., an electrically conductive sublayer within the laminate or another electric contact. The Peltier element can both be supplied with electric energy and be controlled via this connection.

In a further development, the heating sublayer can comprise a plurality of conductive fibers. The conductive fibers can in each case be configured as carbon fiber having an electrically insulating coating.

This further development is based on the idea of using coated carbon fibers as electric conductors for realizing a heating resistance, with the conductive fibers simultaneously being able to function as reinforcing fibers of the overall structure. For example, such conductive fibers can be integrated into a fiber composite in which the conductive fibers are embedded together with further reinforcing fibers in a matrix material, with both the matrix material and the further reinforcing fibers being able to have a vanishing electrical conductivity. A power source can be applied at one end to the conductive fibers in order to pass a heating current through these, e.g., by means of electrically conductive sublayers and/or other electric contacts especially inserted in the laminate.

Owing to the electrically insulating coating of the conductive fibers, leakage currents or similar effects can be suppressed or even avoided completely. The conductive fibers can even readily come into contact without a leakage current or even a short circuit occurring. Such coatings of carbon fibers having a very high heat resistance up to above 700° C. can also be produced relatively cheaply and quickly in mass production. A further advantage arises from the fact that the carbon fibers of the conductive fibers can serve directly as reinforcing fibers of the fiber composite and to a certain extent form a natural constituent of the latter without discontinuities or electrochemical reactions occurring. The electrically insulating coating can also be optimally selected so that no impairment of the bonding behavior occurs, i.e., the conductive fibers have a bonding behavior similar to that of uncoated carbon fibers.

For example, the conductive fibers can be arranged in the form of individual fibers, bundles, tapes, lay-ups, mats, woven fabrics and/or nonwovens or the like. In principle, the conductive fibers can be arranged or integrated in different variants as are known to a person skilled in the art from the general manufacture of fiber composite components.

In a further development, the conductive fibers can have a polymer electrolyte coating as electrically insulating coating.

For example, it is possible to use a solid polymer electrolyte coating. Such polymer electrolyte coatings can have a high heat resistance but at the same time offer excellent bonding properties for incorporation into fiber-reinforced components, e.g., carbon fiber-reinforced thermoplastic.

In a further development, the electrically insulating coating can have a thickness in the range from 0.1 microns to 1 micron. In particular, the electrically insulating coating can have a thickness of 0.5 micron. The carbon fibers can, for example, have a diameter in the range from 6 to 7 microns, so that the resulting diameter of the conductive fibers is from about 7 to 8 microns.

In a further development, the heating sublayer can be arranged between the electric energy store and the cooling sublayer.

In this way, the heating sublayer can be positioned as close as possible to the energy store in order to be able to increase the temperature thereof as efficiently and quickly as possible, e.g., in order to bring the energy store to an optimal operating temperature in the range from, for example, 10° C. to 50° C. at any exterior temperature. The cooling sublayer on the other hand, can be arranged close to an outside of the structural component in order to be able to conduct heat energy to the outside world as efficiently as possible.

In a further development, the electric energy store can be arranged between two electrothermal temperature regulation sublayers.

In this further development, the temperature of the energy store is thus regulated simultaneously from both sides in an optimal way. For example, the energy store can be arranged in a sandwich-like manner between two heating sublayers, with a cooling sublayer being able to adjoin the heating sublayers on the outside.

In a further development, the fiber composite laminate can comprise a plurality of structurally stabilizing fiber reinforcement sublayers. The fiber reinforcement sublayers can comprise glass fibers in an electrically insulating matrix material.

It is thus possible to use materials having a negligible electrical conductivity, e.g., glass fibers, as reinforcing fibers, and also a synthetic resin as matrix material, at least in the region of the electric infrastructure.

In a further development, the electric energy store can comprise a temperature sensor. The control device can be configured for monitoring an instantaneous temperature of the electric energy store by means of the temperature sensor.

For example, an appropriate temperature sensor can be directly inserted into an electrolyte sublayer of the energy store. To read out the temperature, the temperature sensor can, for example, be contacted at the side by the layer structure of the composite laminate and electrically coupled to the control device.

In a further development, the control device can be integrated as a microcontroller into the fiber composite laminate.

The microcontroller can here control the total system of energy store and temperature-control elements in order to charge and discharge energy and/or to regulate the operating temperature of the energy store.

The above embodiments and further developments can, if purposeful, be combined with one another in any way. Further possible embodiments, further developments and implementations of the invention also encompass combinations which are not explicitly mentioned of features of the invention described above or in the following in the context of the working examples. In particular, a person skilled in the art will also add individual aspects as improvements or supplements to the respective basic form of the present invention.

BRIEF DESCRIPTION OF THE DRAWINGS

The present invention will be illustrated below with the aid of the working examples indicated in the schematic figures. The figures show.

Figure 1:
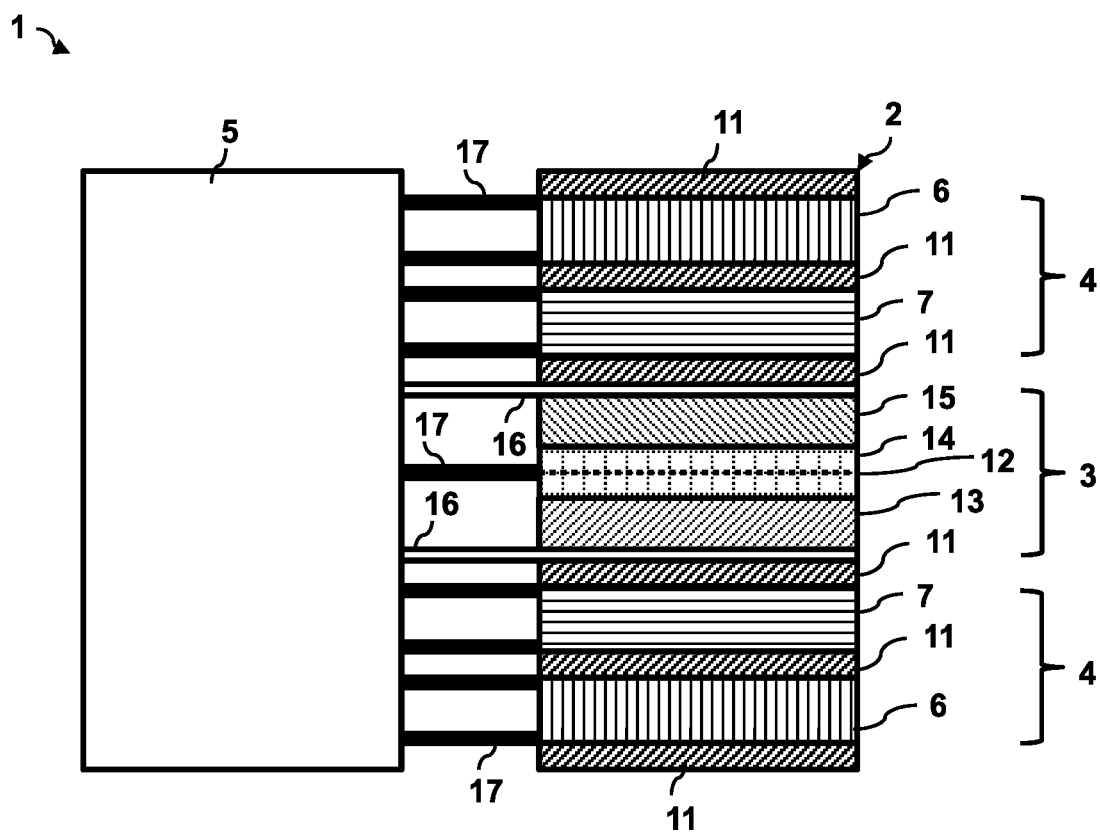
FIG. 1 shows a schematic sectional view of a structural component as per one embodiment of the invention.

The accompanying figures are intended to assist a further understanding of the embodiments of the invention. They illustrate embodiments and, in combination with the description, serve to explain principles and concepts of the invention. Other embodiments and many of the advantages mentioned can be seen from the drawings. The elements of the drawings are not necessarily shown true to scale relative to one another.

In the figures of the drawing, elements, features and components which are identical, have the same function or have the same effect are, unless indicated otherwise, each provided with the same reference numerals.

DETAILED DESCRIPTION OF THE PREFERRED EMBODIMENTS

Figure 2:
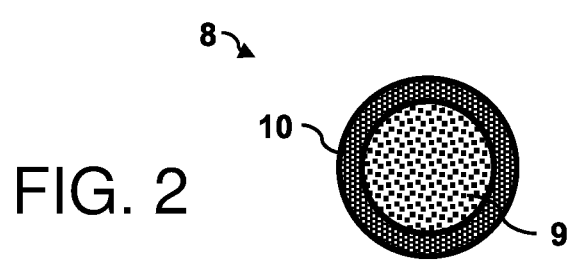
FIG. 2 shows a schematic sectional view of a conductive fiber of the structural component of FIG. 1.
Figure 3:
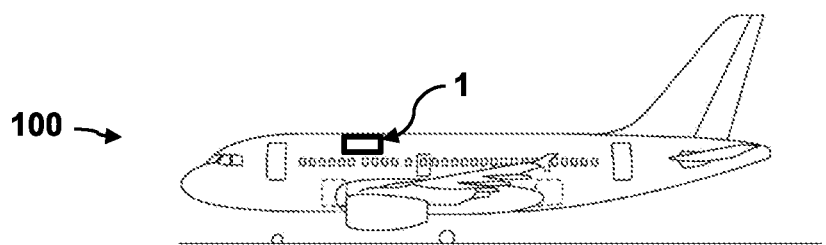
FIG. 3 shows a schematic side view of an aircraft comprising the structural component of FIG. 1.

FIG. 1 shows a schematic sectional view of a structural component 1 as per one embodiment of the invention. FIG. 2 shows a conductive fiber as is used in the structural component 1. FIG. 3 is a side view of an aircraft 100, e.g., a passenger aircraft, comprising such a structural component 1.

The structural component 1 can be, in particular, a structural component of a primary structure of the aircraft 100, for example a structural, connecting and/or stiffening element of a fuselage and/or of a wing spar, e.g., a former, a stringer, a crossmember, a beam, a skin segment, a connecting element or the like. A variety of geometric curved or uncurved shapes as are known to a person skilled in the art from vehicle construction are conceivable here. Purely by way of illustration, the structural components 1 can be rod-shaped, optionally with a particular transverse profile such as L, T, Z, Ω, etc., or have a plate-like/flat configuration. In principle, structural components 1 as are described below can be used not only in aircraft but also in general air vehicles or other applications in the transport industry, e.g., in land vehicles, watercraft or rail vehicles.

The structural component 1 of FIG. 1 is made as fiber composite laminate 2 of a plurality of fiber composite sublayers, as is known in principle to a person skilled in the art from aircraft construction for the manufacture of structural components. In other words, the sublayers of this laminate structure form the supporting structure of the component 1.

For this purpose, the fiber composite laminate 2 in this illustrative case comprises, in particular, a plurality of fiber reinforcement sublayers 11 composed of a glass fiber composite material. These sublayers firstly have a structurally stabilizing effect. Secondly, specifically glass fibers are electrically insulating and in combination with an appropriate matrix material (e.g., synthetic resin) can separate electrically conductive or functional layers of the fiber composite laminate 2, as are described below, from one another.

The fiber composite laminate 2 further comprises an electric energy store 3 which is configured as a multilayer electrochemical fiber composite battery for storing electric energy in a rechargeable manner. The electric energy store 3 here is structurally integrated into the fiber composite laminate 2 and is manufactured together with the latter. This means that the supporting structure of the aircraft 100 can store energy and also retrieve this and make it available for use, e.g., for electric loads in a passenger cabin, in a cockpit or in a freight space of the aircraft 100 and/or for an electric drive of the aircraft 100.

In recent decades, structural applications using laminated composite materials have increased in the field of air and space travel. Laminated composite structures here consist of layers of orthotropic materials. Advantages of the use of fiber-reinforced composite materials compared to conventional materials are, inter alia, a lower intrinsic weight, high specific strength, excellent fatigue strength, high stiffness-to-weight ratio and design flexibility.

Structural batteries can, for example, comprise carbon fibers as an anode (e.g., embedded in a suitable binding polymer), a cathode composed of coated carbon fibers (e.g., LiFePO4-coated, i.e., with particles having a lithium-metal oxide basis, and likewise embedded in an appropriate structural electrolyte polymer), a separator having embedded glass fibers to separate the electrodes and to transport the ions further, a suitable electrolyte material (e.g., a polymerized vinyl ester derivative of a poly(ethylene glycol) electrolyte) and also current collectors or power outlet leads for connection to an external current circuit (e.g., additively applied sublayers/coatings composed of a metal material). Owing to the integrated capability of storing energy, such a combination of materials offers considerable weight savings on a system level. Carbon fibers are particularly suitable as electrodes for structural composite batteries because of their mechanical properties and the ease with which they can incorporate lithium ions. Carbon fibers have a high stiffness and strength and offer mechanical reinforcement and a favorable electrical conductivity for the transport of electrons into and out of the battery (cell).

In the example of FIG. 1, the energy store 3 comprises a stacked structure having a lowermost anode layer 13, e.g., carbon fibers embedded in a structural solid-state electrolyte (e.g., synthetic resin enriched with lithium ions). On top of the anode layer 13, there is an electrolyte sublayer 14 containing glass fibers. On top of this, there is in turn a cathode sublayer 15 comprising carbon fibers (e.g., LiFePO4-coated and likewise embedded in a solid-state electrolyte). The two electrode sublayers 13, 15 are contacted by electrically conductive sublayers 16 which can, for example, comprise a metal, e.g., aluminum, copper foil, etc.

It goes without saying that the above specific embodiment of the energy stores is purely illustrative and a person skilled in the art can, as an alternative or in addition, employ all known technical solutions for implementing a structurally integrated energy source.

Overall, this thus leads to the structural component or components 1 of the aircraft 100 being able to be provided with integrated energy storage capabilities (structural batteries) without cables or connections being required since they can be regulated via the integrated energy transfer and also suitable control and monitoring devices. A structural energy storage and supply with rapid charging and discharging capability without connections, wires, cable systems and without the usual installation outlay during assembly is thus provided.

The electrically conductive sublayers 4 are connected to a microcontroller which is configured as a control device 5 in order to regulate charging and discharging of electric energy to or from the energy store 3. The energy store 3 additionally contains a temperature sensor 12 which is likewise connected via an electric contact 17 to the control device. The control device 5 is configured for monitoring the instantaneous temperature of the electric energy store 3 by means of the temperature sensor 12.

In order not only to be able to monitor the temperature of the energy store 3 but also to be able to regulate it actively, the fiber composite laminate 2 further comprises an electrothermal temperature regulation sublayer 4 which is arranged both above and below the energy store 3 and is configured for supplying thermal energy to the electric energy store 3 and conducting thermal energy away from the electric energy store 3 when required in order to regulate the temperature. These temperature regulation sublayers 4 are also connected to the control device 5. The control device 5 is thus configured for controlling the temperature regulation of the electric energy store 3 by means of the electrothermal temperature regulation sublayers 4.

Each electrothermal temperature regulation sublayer 4 is separated from the energy store 3 by a fiber reinforcement sublayer 11 which comprises glass fibers in an electrically insulating matrix material. Each electrothermal temperature regulation sublayer 4 additionally contains a cooling sublayer 6 and a heating sublayer 7, which are likewise in turn separated from one another and from an outer surface of the fiber composite laminate 2 by means of a fiber reinforcement sublayer 11.

The cooling sublayer 6 is here configured as a Peltier element in order to conduct thermal energy away from the electric energy store 3 when required in order to cool the latter.

Moreover, the heating sublayer 7 is arranged between the electric energy store 3 and the cooling sublayer 6 and is configured for supplying thermal energy to the electric energy store 3 when required in order to heat the latter. For this purpose, the heating sublayer 7 comprises a plurality of conductive fibers 8. As shown in FIG. 2, each conductive fiber 8 comprises a carbon fiber 9 (this can be an individual fiber or a fiber bundle) having an electrically insulating polymer electrolyte coating 10.

Such an electrochemical coating can, for example, be produced by dipping the carbon fiber 9 into a suitable electrochemical bath. For example, the carbon fiber 8 can have a diameter of several microns. Such a polymer electrolyte coating can be made very thin, for example with a thickness of less than one micron, so that the total diameter of the conductive fiber 8 barely differs from that of the carbon fiber 9.

Both the cooling sublayer 6 and the heating sublayer 7 are electrically connected via appropriate electric contacts 17 and/or electrically conductive sublayers 16 to the control device 5, so that the latter can send an appropriate current into the cooling sublayer 6 or the heating sublayer 7 for the purpose of cooling or heating the energy store 3. In the case of the cooling sublayer 6, the electric current flows through the semiconductor transitions successively, so that a temperature gradient is established between an upper side and an underside of the cooling sublayer 6. In the case of the heating sublayer 7, a corresponding electric current flows through the carbon fibers 9 of the conductive fibers 8 which heat up because of their electrical resistance. The heat which arises is conducted into the energy store 3.

This configuration of the conductive fibers 8 offers a number of advantages for use in a fiber composite structure. Firstly, the conductive fiber 8 has similar properties as an ordinary carbon fiber in respect of structure and also in respect of compatibility with fiber composite material. For this reason, it can readily be used as a reinforcing fiber in fiber composite components or be integrated into the latter, without undesirable reactions occurring. Secondly, the polymer electrolyte coating can be an electric insulator which can electrically insulate a conductive fiber 8 from further conductive fibers 8 without leakage currents and/or short circuits between a plurality of power fibers 8 through which current flows and which are adjacent occurring. In addition, such a conductive fiber 8 is sufficiently heat resistant.

It goes without saying that the fiber composite laminate can additionally comprise signal transmission sublayers or that the electrically conductive layers 16 can be used for signal transmission in order to control and/or regulate the energy store. As an alternative or in addition to the temperature, currents and/or voltages within the structure can be measured. The data based thereon can be transmitted further to a battery management system (BMS) which can, for example, be integrated into the control device 5 or be connected thereto. On the basis of the data, conclusions regarding the state of charging, etc., can be drawn and the energy store 3 can be regulated correspondingly.

An integrated multifunctional fiber composite structure which comprises a temperature-regulatable energy store which can at any time be actively cooled or heated according to an operating mode desired at the particular time is thus created, with no separate cables, electric conductors, cable holders and/or clamps, etc., being required because of the integration of the total structure into a composite laminate. The associated weight and the installation and assembly outlay which is normally necessary and the costs associated therewith can thus also be avoided. The system is characterized by negligible electrical resistance losses and high reaction speeds.

In the detailed description above, various features have been combined in one or more examples in order to improve the conciseness of the depiction. However, it should be clear that the above description is purely of an illustrative nature and does not constitute any restriction. It is intended to cover all alternatives, modifications and equivalents of the various features and working examples. Many other examples will be immediately and directly clear to a person skilled in the art in the light of the description above on the basis of such a person's specialist knowledge.

The working examples have been selected and described in order to be able to present the principles underlying the invention and their possible uses in practice in the best possible way. On this basis, persons skilled in the art can optimally modify and utilize the invention and its various working examples for the intended use. In the claims and the description, the terms "containing" and "having" are used as neutral terminology for the corresponding term "comprising". Furthermore, use of the terms "a", "of one" and "one" does not in principle rule out a plurality of features and components described in this way.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE NUMERALS

1 Structural component
2 Fiber composite laminate
3 Energy store
4 Temperature regulation sublayer
5 Control device
6 Cooling sublayer
7 Heating sublayer
8 Conductive fiber
9 Carbon fiber
10 Coating
11 Fiber reinforcement sublayer
12 Temperature sensor
13 Anode sublayer
14 Electrolyte sublayer
15 Cathode sublayer
16 Electrically conductive sublayer
17 Electric contact
100 Aircraft

The invention claimed is:

1. A structural component of a primary structure for a vehicle, wherein the structural component comprises:
a fiber composite laminate with a plurality of structurally stabilizing fiber reinforcement sublayers, the fiber composite laminate comprising:
an electric energy store which is configured as a multilayer electrochemical fiber composite battery to store electric energy in a rechargeable manner; and
an electrothermal temperature regulation sublayer which is configured to supply thermal energy to the electric energy store and conduct thermal energy away from the electric energy store as required to regulate a temperature, wherein the electrothermal temperature regulation sublayer comprises a cooling sublayer configured to conduct thermal energy away from the electric energy store when required to cool the electric energy store, wherein the cooling sublayer comprises a Peltier element; and
a control device connected to the electric energy store and the electrothermal temperature regulation sublayer which is configured to control a temperature regulation of the electric energy store by means of the electrothermal temperature regulation sublayer.

2. The structural component according to claim 1, wherein the electrothermal temperature regulation sublayer further comprises a heating sublayer, where the heating sublayer is configured to supply thermal energy to the electric energy store when required to heat the electric energy store.

3. The structural component according to claim 2, wherein the heating sublayer comprises a plurality of conductive fibers which are each configured as carbon fiber having an electrically insulating coating.

4. The structural component according to claim 3, wherein the conductive fibers have a polymer electrolyte coating as an electrically insulating coating.

5. The structural component according to claim 2, wherein the heating sublayer is arranged between the electric energy store and the cooling sublayer.

6. The structural component according to claim 1, wherein the electric energy store is arranged between two electrothermal temperature regulation sublayers.

7. The structural component according to claim 1, wherein the plurality of structurally stabilizing fiber reinforcement sublayers comprise glass fibers in an electrically insulating matrix material.

8. The structural component according to claim 1, wherein the electric energy store comprises a temperature sensor, where the control device is configured for monitoring an instantaneous temperature of the electric energy store by means of the temperature sensor.

9. The structural component according to claim 1, wherein the control device is integrated as a microcontroller into the fiber composite laminate.

10. The structural component according to claim 1, wherein the vehicle comprises an aircraft or spacecraft.

11. An aircraft or spacecraft comprising a structural component according to claim 1.

12. A structural component of a primary structure for a vehicle, wherein the structural component comprises:
a fiber composite laminate, comprising:
an electric energy store which is configured as a multilayer electrochemical fiber composite battery to store electric energy in a rechargeable manner; and
an electrothermal temperature regulation sublayer which is configured to supply thermal energy to the electric energy store and conduct thermal energy away from the electric energy store as required to regulate a temperature, wherein the electrothermal temperature regulation sublayer comprises:
a heating sublayer configured to supply thermal energy to the electric energy store when required to heat the electric energy store; and
a cooling sublayer configured to conduct thermal energy away from the electric energy store when required to cool the electric energy store; and a control device connected to the electric energy store and the electrothermal temperature regulation sublayer which is configured to control a temperature regulation of the electric energy store by means of the electrothermal temperature regulation sublayer.

13. The structural component according to claim 12, wherein the cooling sublayer comprises a Peltier element.

14. The structural component according to claim 12, wherein the heating sublayer comprises a plurality of conductive fibers which are each configured as carbon fiber having an electrically insulating coating.

15. The structural component according to claim 14, wherein the conductive fibers have a polymer electrolyte coating as an electrically insulating coating.

16. The structural component according to claim 12, wherein the heating sublayer is arranged between the electric energy store and the cooling sublayer.

17. The structural component according to claim 12, wherein the electric energy store is arranged between two electrothermal temperature regulation sublayers and wherein the control device is integrated as a microcontroller into the fiber composite laminate.

18. The structural component according to claim 12, wherein the fiber composite laminate comprises a plurality of structurally stabilizing fiber reinforcement sublayers which comprise glass fibers in an electrically insulating matrix material.

19. The structural component according to claim 12, wherein the electric energy store comprises a temperature sensor, where the control device is configured for monitoring an instantaneous temperature of the electric energy store by means of the temperature sensor.

20. The structural component according to claim 12, wherein the vehicle comprises an aircraft or spacecraft.

* * * * *